United States Patent [19]

Aoki et al.

[11] Patent Number: 5,556,581
[45] Date of Patent: Sep. 17, 1996

[54] METHOD OF INJECTION MOLDING POLYETHYLENE TEREPHTHALATE

[75] Inventors: Hidemi Aoki; Yasuhiko Takeuchi; Kazuo Anzai, all of Hanishina-gun, Japan

[73] Assignee: Nissei Plastic Industrial Co., Ltd., Nagano-ken, Japan

[21] Appl. No.: 452,425

[22] Filed: May 26, 1995

Related U.S. Application Data

[62] Division of Ser. No. 292,510, Aug. 18, 1994.

[30] Foreign Application Priority Data

Aug. 24, 1993 [JP] Japan .................................. 5-229664
Mar. 7, 1994 [JP] Japan .................................. 6-059788

[51] Int. Cl.$^6$ ......................................................... B29B 7/62
[52] U.S. Cl. ................................ 264/40.1; 264/211.23; 264/349; 366/76.2
[58] Field of Search ................................ 264/40.1, 328.17, 264/328.18, 349, 211.23; 366/76.1, 76.2, 76.3; 425/135, 145, 154, 205

[56] References Cited

U.S. PATENT DOCUMENTS

| | | | |
|---|---|---|---|
| 4,247,519 | 1/1981 | Sano | 425/203 |
| 4,286,882 | 9/1981 | Schiesser | 366/762 |
| 4,578,455 | 3/1986 | Pipper et al. | 425/203 |
| 4,670,203 | 6/1987 | Chang | 425/203 |
| 4,818,113 | 4/1989 | Patel | 366/76.2 |
| 5,261,743 | 11/1993 | Moller | 366/76.3 |
| 5,385,462 | 1/1995 | Kodama et al. | 425/230 |

FOREIGN PATENT DOCUMENTS 60-116424  6/1985  Japan .
5-318531  12/1993  Japan .

*Primary Examiner*—Jill L. Heitbrink
*Attorney, Agent, or Firm*—Weingarten, Schurgin, Gagnebin & Hayes

[57] ABSTRACT

A method of injection molding whereby a polyethylene terephthalate (PET) without being predried or with having an irregular-shape is fed by a feed screw from a material feeder to an injection cylinder and plasticated by an injection screw. The rotational torque of the injection screw is detected in correspondence with the revolution speed of the feed screw during material feed, and a flection point of the rotational torque is determined. The feed screw is operated at a revolution speed within a range around the flection point of the rotational torque to provide a stable feed rate of the PET and to avoid difficulty in rotating the injection screw.

3 Claims, 3 Drawing Sheets

METHOD OF INJECTION MOLDING POLYETHYLENE TEREPHTHALATE

This application is a division of application Ser. No. 08/292,510, filed Aug. 18, 1994.

BACKGROUND OF THE INVENTION

1. Field of the Invention

The present invention relates to a method of injection molding a polyethylene terephthalate in which a polyethylene terephthalate in an undried state can be injection molded into a required molded article, and even an irregular-shape molding material with irregular size such as flake, pellet and powder-like one can be fed to an injection machine.

2. Background Art

A polyethylene terephthalate (hereinafter abbreviated as PET) generally used as a material resin for packaging containers and the like has moisture-absorption characteristics, so that if a PET, as it is, is fed as a molding material to an injection machine, a poor biting into a screw, a variation in metering, or a hydrolysis due to the vaporization of the water content contained therewithin would occur, and thus a predrying has been considered to be required when using the PET.

Particularly, a molding material which is manufactured by pulverizing used PET products into flake-like pieces in order to reuse them has an irregular size of flake and a water content due to moisture absorption varying with respective flakes, so that the material requires a more effective predrying than an unused molding material having even particles.

The above-mentioned preheating requires about four hours at a temperature of 150° C. for PET used as a crystal resin. Therefore, the predrying must be started in the early morning, and where an automatic molding is performed continuously around the clock, the setting of feed rate must be strictly performed so that drying is compatible with molding. An inconvenience also exists in that even when injection molding is successfully being performed, a trouble with a dryer causes molding to have to be stopped.

When a molding material is flake or powder in shape, an attempt to feed the material from a hopper to an injection machine by gravity causes the material to form a bridge in the hopper and thus feed rate to become unstable. As conventional means for preventing such phenomenon to effect a stable feed, there has been employed a hopper including a screw.

A method of disposing a feed screw in the material feed section of an injection molding or an extrusion molding machine, and forcedly feeding a molding material of a thermoplastic resin into the molding machine by the rotation control of the feed screw is described in Japanese Laid-Open Patent Publication Nos. 60-116424, 5-318531 and the like.

The means described in No. 60-116424 detects the pressure of a resin material at a lower portion of a screw type forced feeder disposed in an extrusion machine and at a screw base portion of the extrusion machine by the use of a sensor, and with the output of the sensor, controls the revolution speed of the forced feeder screw so as to make constant the pressure of the resin material at all times, whereby a powder material, as well as a mixed raw material of powder and pellet, a flake-like raw material and the like can be fed stably.

Also, the means described in No. 5-318531 sequentially detects a reaction force preventing the rotation of an injection screw, and controls increasingly/decreasingly the feed speed of a pellet feeder in correspondence with the increase/decrease in the reaction force, thereby controlling the pellet feed.

In the above-mentioned means of detecting the pressure of the resin raw material to control the revolution speed of the forced feeder screw, with the fed-out force due to the forced feeder screw, it is difficult to keep constant the pressure of a flake-like molding material having a density larger than a powder-like material, and the pressure is apt to change. Therefore, the rotation control is performed frequently, and even if a rotation control by the detection of the pressure of a resin raw material is employed, the stable feed of the flake-like molding material cannot be performed due to a problem with response.

The other above-mentioned means for sequentially detecting a reaction force preventing the rotation of an injection screw, and controlling increasingly/decreasingly the feed speed of a molding material is as with the above means, so that new means is required to attain a stable feed of a flake-like, irregular-shape molding material.

SUMMARY OF THE INVENTION

An object of the present invention is to solve the problems with the PET injection molding due to the above-mentioned predrying by employing an injection machine having a vent function, and to provide an injection molding method in which a PET can be molded with the predrying omitted.

Although the injection molding of a material resin using an injection machine having a vent function is a well-known technique, there has been no precedent employed in the PET injection molding, so that in injection molding a PET, a molded article having a good molding state can be obtained only by finding new molding conditions having been never found.

The molding conditions include heating temperature, compression ratio, vent position and vent means. The present inventors have studied them and finally found that it is preferable that vent is forcedly performed by vacuum suction, and it is most preferable that the vacuuming is performed within a range of a specified degree of vacuum.

Accordingly, a feature of the present invention exists in that a molding material consisting of an undried PET is fed into an injection machine having a vent function and injection molded with the vent vacuumed to 50 to 150 torr. (equal to 6666.1~19998.3 Pa.).

Although within a vacuum range other than 50 to 150 torr, a hydrolysis due to remaining water content, or a vent up occurs to cause molding to become difficult, in the continuous suction within a range of the degree of vacuum specified by the present invention, the above-mentioned trouble with molding does not occur, and even though the undried PET whose predrying is omitted is used as a molding material, the water content and the like in the material is forcedly removed during plasitication and kneading, so that a transparent, high-quality molded article with an improved strength is obtained.

As a result, the time, labor, facility and the like required for predrying become unnecessary, and an automatic molding using an undried PET becomes practically possible, whereby the productivity is improved and also the molding cost reduced.

Another object of the present invention is to provide a method comprising of the steps of understanding the trend of the rotational torque of a plasticating screw in correspondence with the revolution speed of a feed screw during material feed, and using the trend, setting the rotation of the feed screw so that a material with a certain density held can be fed, thereby allowing not only a flake-like, irregular-shape molding material but also other irregular-shape materials to be stably fed to an injection machine having a vent function.

Another feature of the present invention according to the above-mentioned object exists in that a feed screw is disposed in the material feed section of an injection molding or an extrusion molding machine including a plasticating screw in its cylinder, and when a molding material of an irregular-shape thermoplastic resin with irregular size and shape is forcedly fed into the cylinder by the rotation of the feed screw, the material feed is performed by detecting the rotational torque of the plasticating screw in correspondence with the revolution speed of the above-mentioned feed screw during material feed and setting the revolution speed of the feed screw taking the flection point of the rotational torque as a guide.

Such feed means can be employed either in a hydraulic molding machine using a hydraulic system as a drive source of the plasticating screw and a motor as a drive source of the feed screw, or in a motor-driven molding machine using motors as drive sources of both the plasticating screw and the feed screw.

For the hydraulic molding machine, a difference in hydraulic pressure between the inlet and the outlet of an oil motor rotationally driving the plasticating screw is detected as the rotational torque of the plasticating screw. For the motor-driven molding machine, a current value of a motor of the plasticating screw is measured, and the measured value is detected as the rotational torque.

Usually, when with the revolution speed of the plasticating screw set to a certain value, the revolution speed of the feed screw during material feed is allowed to increase gradually to increase the feed rate of a material, the rotational torque of the plasticating screw increases in correspondence with the revolution speed. However, when the revolution speed reaches a certain value, the rotational torque rapidly increases to change. The present invention takes the changed point as a flection point and uses the point as a guide to setting of the revolution speed of the feed screw, and at a revolution speed exceeding that at the flection point, the remarkable increase of the rotational torque causes the plasticating screw to become difficult to rotate and finally to stop.

However, for the material feed by the revolution speed within a range around the flection point, the density of the molding material is kept proper by the feed screw; the biting of the molding material by the rotation of the plasticating screw does not exhibit a variation; and even for the molding for a prolonged period, a required amount of the molding material is fed at all times to stabilize plastication, thereby eliminating the unstableness of the metering time which has been a problem with the irregular-shape molding material for the injection molding machine.

Thus, even for a flake-like reprocessed resin of pulverized material whose feed rate has been apt to vary due to poor biting, the material is fed with a proper density kept, with the result that plastication and metering become stable to allow a good article to be molded. The machine needs only to detect the flection point and perform metering by the use of the revolution speed at the point, so that technically no complex operation is required and even when the molding material is changed, a flection point suitable for the changed material is detected to set easily a required revolution speed, and thus such operation can also be applied to a mixture consisting of a plurality of molding materials having a shape and the like different from each other, thereby allowing a stable feed to be performed.

DETAILED DESCRIPTION OF THE PREFERRED EMBODIMENTS

Figure 1:
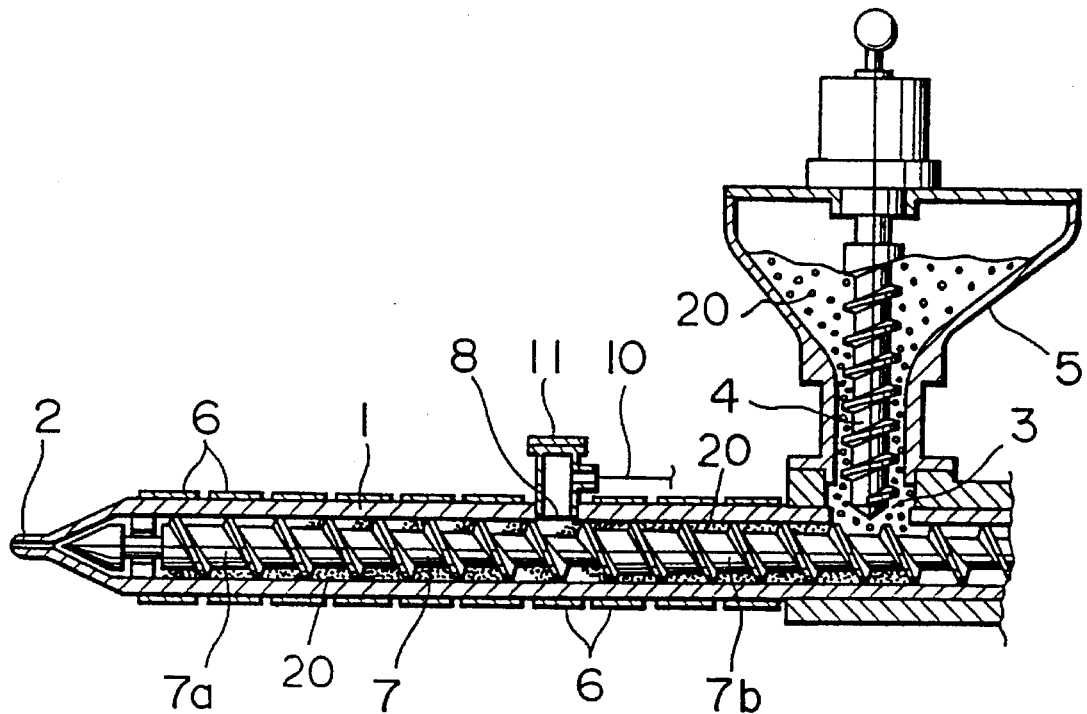
FIG. 1 is a schematic, longitudinal sectional view of an injection molding machine capable of performing a method of injection molding an undried PET in connection with the present invention.
Figure 2:
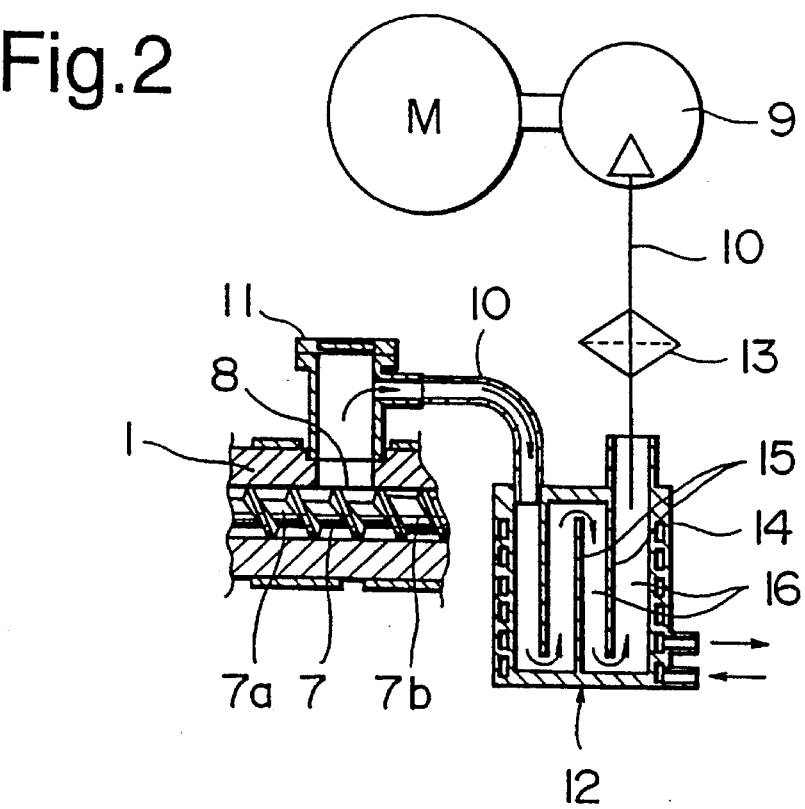
FIG. 2 is a schematic sectional view of a vacuum unit used in the above-mentioned method.

In FIGS., the numeral 1 indicates a heating cylinder which has a nozzle 2 at its head and mounts a material feeder 5 including a feed screw 4 at its rear feed port 3. A band heater 6 is mounted on the outer periphery of the injection cylinder 1, and an injection screw 7 is rotatably and forward/backward movably included in its inside.

The above-mentioned injection screw 7 comprises a front screw 7a in which the axial diameter of its head portion is formed into a larger diameter than that of the other portion to form a compression section and a rear screw 7b, and a vent port 8 is provided in the cylinder wall on the rear portion of the front screw 7a.

Connected to the vent port 8 is through a member 11 a vacuum circuit 10 using a vacuum pump 9, which pump allows the inside of the vent port to be vacuumed to 50 to 150 torr and at the same time, a pellet-like molding material 20 to be plasticated and kneaded.

Disposed in the vacuum circuit 10 are a recovery tank 12 for cooling and removing a vaporized content from the molding material 20 and a filter 13. The above-mentioned recovery tank 12 consists of an enclosure in which the inside of the enclosure whose peripheral wall is composed of a jacket 14 is comparted alternately by portion walls 15, which portion walls form a passage 16 of the vaporized content sucked into the inside, thereby cooling the vaporized content introduced from the above-mentioned vent prot 8 into the enclosure by the use of a cooling water flowing through the above-mentioned jacket 14 to recover.

In the molding by the use of the injection machine having a vent function, the temperature of the injection cylinder 1 is set to 260° to 280° C. by the above-mentioned band heater 6. In a conventional PET injection molding, the molding material 20 is required to dry previously, while in this embodiment, the material is not dried and as it is, fed from the material feeder 5 into the injection cylinder. An undried PET as the molding material 20, regardless of powder-like or flake-like, is pressure fed into the feed port by the rotation of the feed screw 4, whereby a poor biting is improved and thus a variation in metering of the molding material 20 is prevented.

Although the metering of the molding material 20, as with a common injection molding, is performed in such a manner that the molding material 20 is melted and kneaded while being transferred forward by the injection screw 7, the molding material 20 is not completely melted to the compression section of the rear screw 7b, and fed in a surface-melted softened state into the compression section wherein the material is compressed.

The above-mentioned compressed molding material 20 is pushed out to the rear portion of the front screw 7a, and since the axial diameter of the front screw 7a is smaller than the compression section of the above-mentioned rear screw 7b, and the space on the periphery of the axial part is wider, a vaporized content such as water in the molding material is expanded and vented at the rear portion of the front screw 7a, and at the same time, by the continuous suction of the above-mentioned vacuum pump 9, the vaporized content flows through the vent port 8 to the above-mentioned recovery tank 12 of the vacuum circuit 10.

This causes the water content in the molding material to be completely removed, and the molding material 20 is heated and compressed by the compression section of the front screw 7a so that the material is further melted and kneaded, and then metered in the cylinder head on the front portion of the screw. With the forward movement of the injection screw 7, the molding material 20 is injection charged into a mold so that the undried PET is molded into a required molded article.

Figure 3:
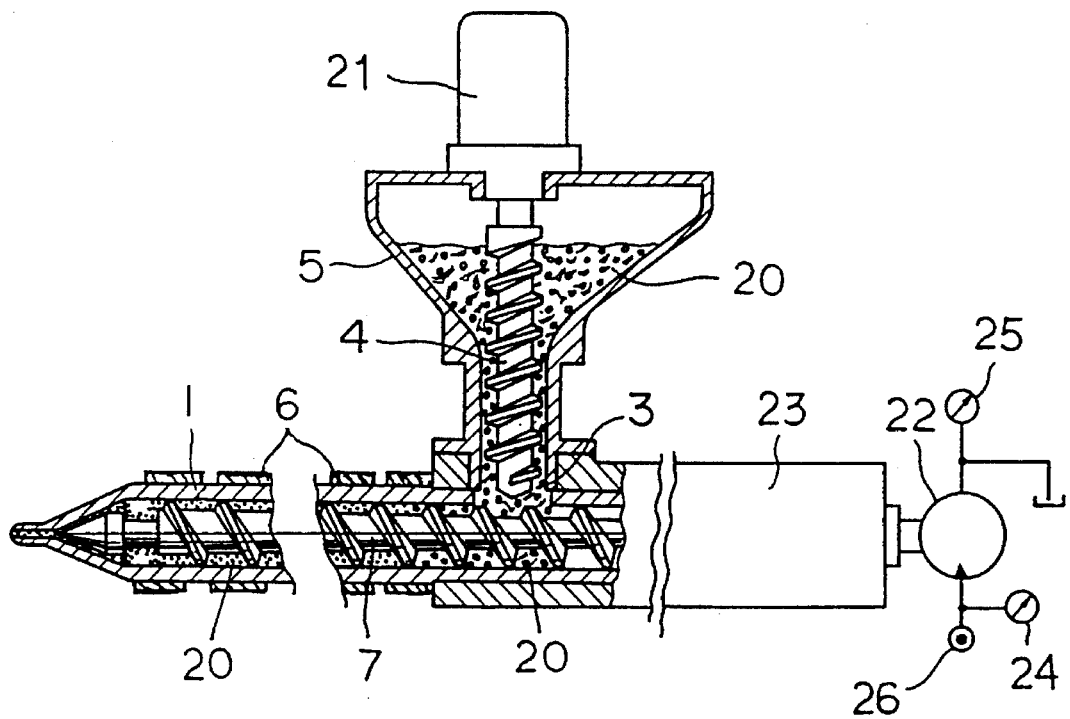
FIG. 3 is a schematic, illustrative view of an injection molding machine capable of feeding an irregular-shape PET in connection with the present invention.

FIG. 3 and following FIGS. are views to help explain means for feeding an irregular-shape molding material which can be employed in the above-mentioned injection molding method.

Provided on the rear portion of the injection cylinder 1 including the injection screw 7 is the material feed port 3, which port is mounted with the material feeder 5 including vertically the feed screw 4 in the center of the inside in such a manner that the head portion of the cylinder formed on the lower portion is fitted to said material feed port 3. In this manner, the head of the feed screw 4 is spaced by a required distance from and positioned near the above-mentioned injection screw 7.

Provided on the material feeder 5 is a motor 21 of the above-mentioned feed screw 4, and the rotation of the feed screw 4 by the motor 21 allows the irregular-shape molding material 20 in the material feeder to be forcedly fed into the material feed port 3.

The numeral 22 indicates a hydraulic motor for rotationally driving the injection screw 7, which is connected to the rear end portion of an injection cylinder 23; and pressure gauges 24, 25 are provided in the hydraulic path on the inlet and outlet side of the hydraulic motor The numeral 26 indicates a hydraulic pump.

In the injection molding machine having the above-mentioned arrangement, with the irregular-shape molding material 20 of a flake-like, reprocessed PE having different shapes and sizes stored in the material feeder 5, and with the revolution speed of the above-mentioned injection screw set to a constant value, when the molding material 20 is forcedly fed to the material feed port 3 by the rotation of the above-mentioned feed screw 4, the molding material 20 is sequentially taken into the injection cylinder 1 by the rotation of the injection screw 7 and thus transferred forward. Further, the material is pressure fed to the screw head portion while being melted and kneaded (plasticated), and by the pressure of the melted material accumulated in the head portion, the injection screw 1 is gradually moved backward to perform metering.

Although the feed rate of the molding material 20 to the injection screw 7 increases in proportion to the revolution speed of the feed screw 4, the revolution speed must be set with consideration to the revolution speed of the injection screw 7, and otherwise the material is fed excessively and strongly compressed against the material feed port 3, thereby causing a large load to be given to the rotation of the injection screw 7 and eventually an unfavorable state to occur.

Figure 5:
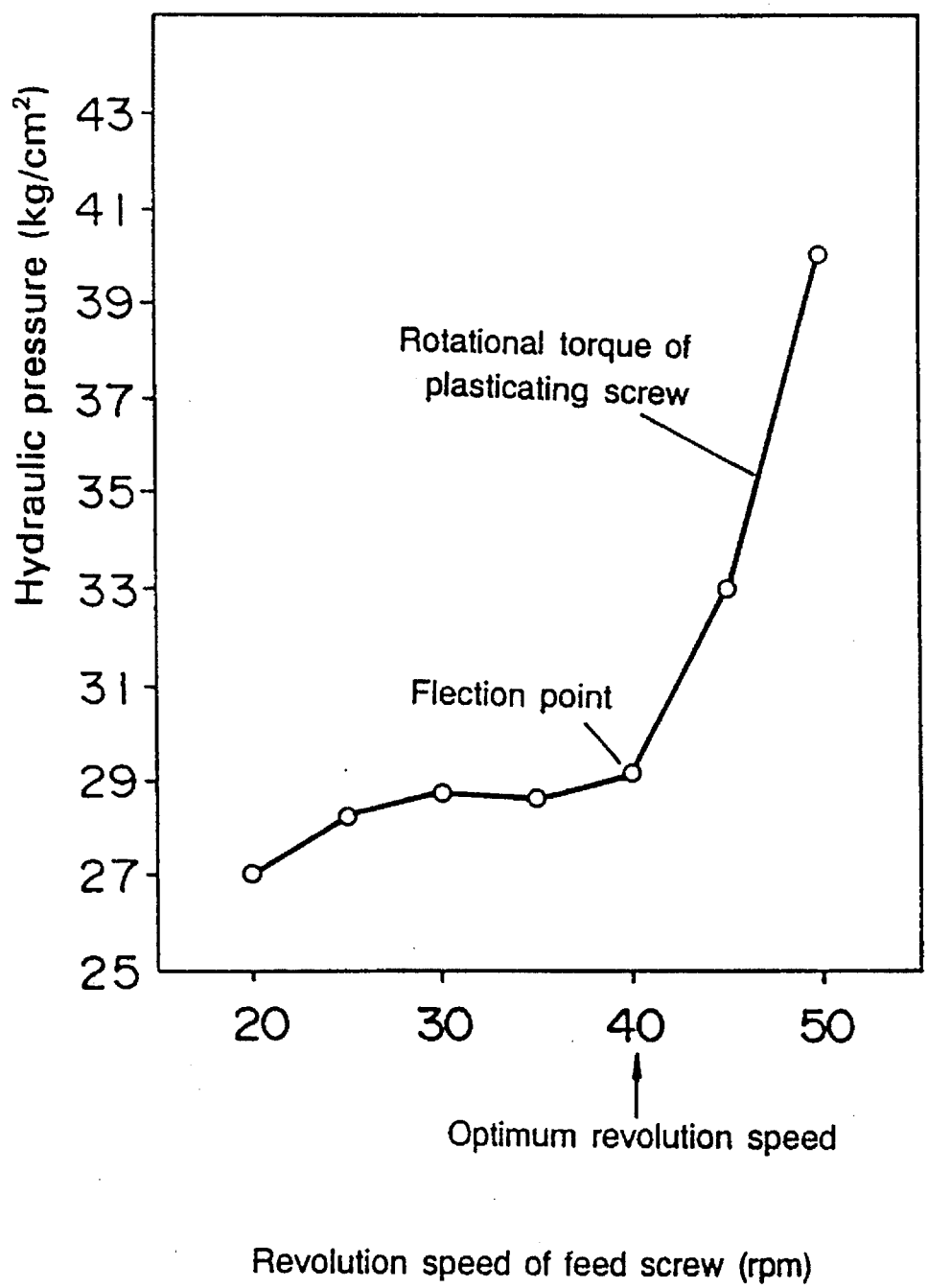
FIG. 5 is a graph showing a relationship of the rotational torque of the plasticating screw to the revolution speed of the feed screw.

Thus, the investigation of the load of the material feed rate to the injection screw 7 at a certain revolution speed for each revolution speed of the feed screw revealed a rotational torque as shown in FIG. 5. The rotational torque of the injection screw 7 is due to a difference in pressure between the pressure gauges 24 and 25 of the above-mentioned hydraulic motor 22.

The design numeral values of the injection screw 7 and the feed screw 4 in the above-mentioned embodiment are as follows:

| •Injection screw | |
| --- | --- |
| Screw diameter | 36.0 mm |
| Groove depth | 5.0 mm (feed zone) |
| L/D | 19.0 |
| Revolution speed | 150.0 rpm |
| •Feed screw | |
| Screw diameter | 32.0 mm |
| Groove depth | 6.0 mm |
| P/D | 0.6 |

| •Feed rate for each revolution speed | | | | |
| --- | --- | --- | --- | --- |
| Revolution speed (rpm) | 20 | 30 | 40 | 50 |
| Feed rate (g/sec) | 3.1 | 4.1 | 5.4 | 6.3 |
| •Head gap of feed screw to injection screw | 50 mm | | | |
| •Molding material | Pulverized material (flake-like) of PET containers | | | |

As obvious from the results shown in FIG. 5, the rotational torque of the injection screw 7 rapidly increased when the revolution speed of the feed screw 4 exceeded 40 rpm, and stopped when the revolution speed exceeded 50 rpm. When feeding the above-mentioned irregular-shape molding material 20 taking the revolution speed at the above-mentioned rapidly changed point as a flection point, at the revolution speed up to a value exceeding somewhat the revolution speed at the flection point, the biting state of the molding material 20 was good and smooth so that no variation occurred in feed rate and each metering time was substantially constant.

However, a lower revolution speed causes the feed rate to become lower and metering to require a time as described above, so that from the shortened metering time point of view, the feed at a low revolution speed is not preferable. A feed at a revolution speed at a point at which a rotational torque significantly exceeding that at the flection point occurs causes a variation in metering time to occur and an energy consumption to increase, though the reason is not obvious.

For the material feed at a revolution speed of 40 rpm at which the flection point of the above-mentioned rotational torque occurs, the energy consumption does not increase to an extent as expected, and a proper feed rate causes a stable material feed to be performed and also the metering time to become a value within an allowable range.

At around a revolution speed of 35 rpm, those other than metering time are the same as at revolution speed of 40 rpm only except that metering time becomes somewhat longer, while at revolution speed of 42 rpm, though the rotational torque increases, no variation in feed rate occurs, so that a stable metering is obtained.

Accordingly, as long as with the revolution speed at the flection point taken as a guide value, the molding material is forcedly fed at a revolution speed within a range around the value, even an irregular-shape molding material apt to be affected by bulk density can be stably fed.

Figure 4:
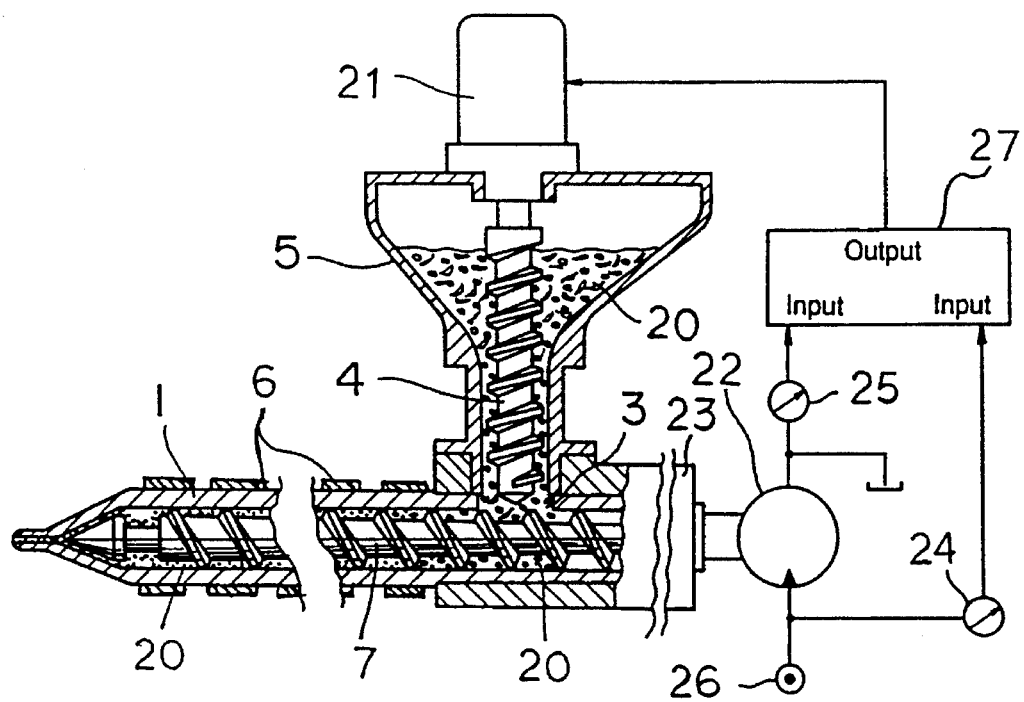
FIG. 4 is a schematic, illustrative view of an injection molding machine of another embodiment.

Although the detection of the above-mentioned flection point is basically performed in such a manner that while changing the revolution speed of the feed screw, the rotational torque of the injection screw 7 for each revolution speed is recorded in a graph, and the flection point is determined from the graph to set the revolution speed of the motor 21, as shown in FIG. 4, an automatic setting of revolution speed may be performed by disposing a controller 27 which electrically calculates a pressure difference due to the pressure gauges 24, 25 to read the rotational torque for each revolution speed, graphically processes the read value to determine the flection point, and instructs the above-mentioned motor 21 to output the revolution speed at the point.

What is claimed is:

1. A method of injection molding a polyethylene terephthalate in which with an injection screw included in an injection cylinder having a vent, an irregular-shape polyethylene terephthalate having irregular size and shape is forcedly fed by a feed screw from a material feeder on the rear portion of the injection cylinder and plasticated by the rotation of the injection screw, and said polyethylene terephthalate is injection molded into a required molded article, comprising the steps of:

detecting the rotational torque of the injection screw in correspondence with the revolution speed of the feed screw during material feed;

determining a flection point of the rotational torque based on the correspondence of the revolution speed of the speed screw verses the rotational torque of the injection screw; and operating the feed screw at a revolution speed within a range around the flection point of the rotational torque so as to provide a stable feed rate of the molding material and to avoid difficulty in rotating the injection screw.

2. A method of injection molding a polyethylene terephthalate as set forth in claim 1, wherein the setting of the revolution speed of the motor of the feed screw is performed in such a manner that while changing the revolution speed of the feed screw, the rotational torque of the injection screw for each revolution speed is recorded in a graph, and the flection point is determined from the graph.

3. A method of injection molding a polyethylene terephthalate as set forth in claim 1, wherein the setting of the revolution speed of the motor of the feed screw is performed in such a manner that a difference in the pressure in the hydraulic path between the inlet and outlet sides of the hydraulic motor of the injection screw is electrically calculated to read the rotational torque for each revolution speed, and the read value is graphically processed to determine the flection point.

\* \* \* \* \*